June 6, 1939.  C. B. RUSSELL  2,161,767
GREASE RETAINER WITH SECURING LUG
Filed Nov. 6, 1936

CASS B. RUSSELL
INVENTOR

PER Albert J. Fihe

ATTORNEY

Patented June 6, 1939

2,161,767

UNITED STATES PATENT OFFICE 2,161,767

GREASE RETAINER WITH SECURING LUG

Cass B. Russell, Detroit, Mich., assignor to Victor Manufacturing & Gasket Company, Chicago, Ill., a corporation of Illinois Application November 6, 1936, Serial No. 109,487

7 Claims. (Cl. 288—1)

This invention relates to an improved grease retainer with securing lug and has for one of its principal objects the provision of a grease retainer or oil seal which can be inserted into an opening in the wall of a casing which contains oil or other fluid to be sealed and which extends through the opening.

One of the important objects of this invention is to provide an oil or fluid seal which is of a simple unitary construction and which can be readily installed in rather difficult locations with a minimum expenditure of time and labor and which will, at the same time, provide a satisfactory and suitable seal against the escape of lubricant or other liquids.

A still further object of the invention is to provide, in an oil seal of the class described, integral means for positioning and retaining the same in desired location in an opening in a casing which contains gears, shafts, and similar apparatus together with the necessary lubricant therefor.

Other and further important objects of the invention will be apparent from the disclosures in the accompanying drawing and following specification.

The invention, in a preferred form, is shown in the drawing and hereinafter more fully described.

Figure 3:
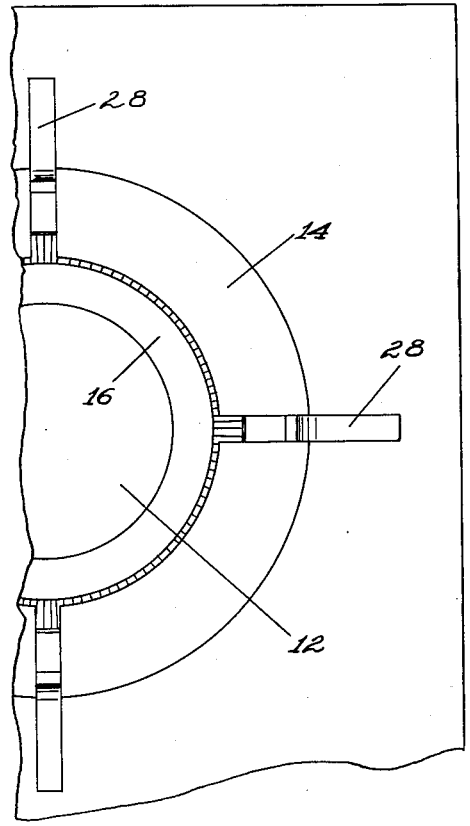
Figure 3 is a front view of the device of Figure 1 in position.

The reference numeral 10 indicates generally a portion of a housing adapted to contain a fluid such as a lubricant and which, for example, may be a transmission housing of an automobile or the like.

In certain of these constructions, difficulty has been experienced in installing suitable fluid seals to guard against leakage of the oil around the rotating shaft 12 which projects out of the housing 10.

One preferred embodiment of the seal of this invention comprises a cup-shaped shell 14 in which is positioned a flexible diaphragm or sealing element 16, the sealing element being preferably retained in position by means of a supporting ring or washer 18 to which the sealing element is molded during the process of manufacture. This molding is ordinarily accomplished in the case of composition packing rings which are made up of synthetic rubber or the like, and the support 18 preferably has a plurality of openings in one face thereof through which portions 20 of the molded packing protrude during the vulcanizing process and whereby a permanent seal is effected between the flexible diaphragm and its supporting metal shell.

After the diaphragm 16 and its support 18 have been positioned in the shell 14, the edge of the shell is then bent inwardly as shown at 22 and thence rearwardly as at 24 to provide a flared face which can be seated against the portion of the housing 10 which surrounds the opening for the shaft 12. A gasket 26 of cork or some other suitable packing material is interposed between the flared portion 24 and the adjacent face of the housing 10 so as to prevent leakage of oil at these points.

Figure 1:
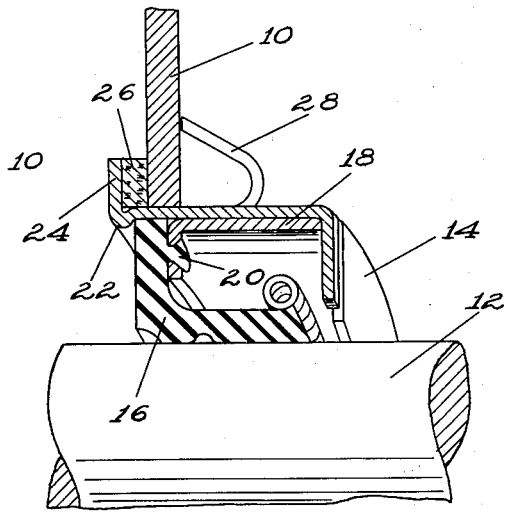
Figure 1 is a sectional view of the improved grease retainer with securing lug of this invention, showing a preferred embodiment thereof.
Figure 2:
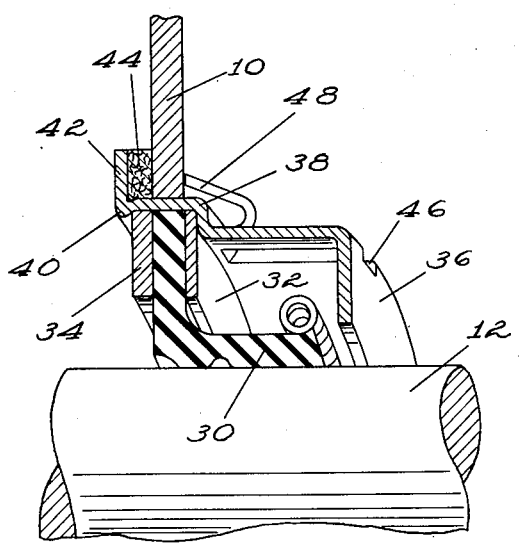
Figure 2 is a similar sectional view, illustrating a modified form of the invention.

The shell 14 of the oil seal is provided with a plurality of pairs of parallel cuts or slits which define between them lugs 28 which may be struck upwardly and outwardly against the inner face of the housing 10 after the seal has been inserted and which thereupon lock the same in desired position as best illustrated in Figures 1 and 2.

A modified form of the invention is illustrated in Figure 2 wherein the diaphragm 30 is supported in position by two flat washer elements 32 and 34 respectively which may be either free therefrom or any one or both of which may be molded thereto. In this construction, the outer shell 36 of the seal is offset as shown at 38 to conform to the internal diameter of the opening in the housing 10 while, at the same time, to provide a shoulder for the seating thereagainst of the washer 32 and the corresponding radial periphery of the diaphragm 30. The rear or outer end of the shell 36 is beaded or struck inwardly at 40 similarly to the construction shown at 22 in Figure 1 in order to retain the diaphragm and its surrounding washers in proper position against the shoulder 38, and the remaining edge of the shell is then flared outwardly as illustrated at 42 to provide a seating support for the entire seal, the usual packing or gasket 44 being interposed beneath this flange.

In this embodiment of the invention, the retaining lugs are shorter than the lugs 28, being merely struck outwardly from the periphery of the shell 36 by means of parallel slits as indicated at 46, and the resultant lugs 48 are bent upwardly and rearwardly against the inner face of the housing 10 in the same manner as illustrated at 28 in Figure 1.

It will be evident that herein is provided a fluid seal which is economical of construction, simple to install and which will remain in position for any desired length of time but which will also be readily removable in the event that repairs or replacements are ever desired. An adequate tight fit and seal between both the rotating shaft and the surrounding housing or casing is also provided without in any way increasing the cost, weight or size of the seal itself.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A fluid seal, comprising an outer shell, a flexible packing element mounted in the shell, and means integral with the shell for mounting the same in position in a housing, said means including lugs struck upwardly and outwardly from the material of the shell, together with a peripheral flange at the outer end of the shell, and means associated with the flange for retaining the flexible diaphragm in position in the shell, said means comprising an inwardly extending projection at the base of the flange.

2. A fluid seal, comprising an outer shell, a flexible packing element mounted in the shell, and means integral with the shell for mounting the same in position in a housing, said means including lugs struck upwardly and outwardly from the material of the shell, together with a peripheral flange at the outer end of the shell, and means associated with the flange for retaining the flexible diaphragm in position in the shell, said means comprising an inwardly extending projection at the base of the flange, and a washer beneath the projection and contacting the packing.

3. A fluid seal, comprising an outer shell, a flexible packing element mounted in the shell, and means integral with the shell for mounting the same in position in a housing, said means including lugs struck upwardly and outwardly from the material of the shell, together with a peripheral flange at the outer end of the shell, and means associated with the flange for retaining the flexible diaphragm in position in the shell, said means comprising an inwardly extending projection at the base of the flange, and a washer beneath the projection and contacting the packing, together with an integral shoulder in the shell against which the packing is seated.

4. A fluid seal, comprising an outer shell, a flexible packing element mounted in the shell, and means integral with the shell for mounting the same in position in a housing, said means including lugs struck upwardly and outwardly from the material of the shell, together with a peripheral flange at the outer end of the shell, and means associated with the flange for retaining the flexible diaphragm in position in the shell, said means comprising an inwardly extending projection at the base of the flange, and a washer beneath the projection and contacting the packing, together with an integral shoulder in the shell against which the packing is seated, and a washer between the shoulder and the packing.

5. A fluid seal, comprising an outer shell, a flexible packing element mounted in the shell, lugs and a flange integral with the shell for mounting the same in position in a housing, together with a packing supporting and positioning element in the shell, said element comprising a cup-shaped shell slidably fitted in the outer shell and a vulcanized connection between the packing and one face of the cup-shaped shell.

6. A fluid seal, comprising an outer shell, a flexible packing element mounted in the shell, and means integral with the shell for mounting the same in position in a housing, together with a packing supporting and positioning element in the shell, said element comprising a pair of washers contacting the packing and fitted in the shell.

7. A fluid seal, comprising an outer shell, a flexible packing element mounted in the shell, and means integral with the shell for mounting the same in position in a housing, together with a packing supporting and positioning element in the shell, said element comprising a pair of washers contacting the packing and fitted in the shell, and a vulcanized bond between the washers and the packing.

CASS B. RUSSELL.